United States Patent [19]

Rebhan

[11] Patent Number: 5,756,132
[45] Date of Patent: May 26, 1998

US005756132A

[54] MILK REPLACER FOR CALVES, AND METHOD

[75] Inventor: Herbert Rebhan, New Richmond, Wis.

[73] Assignee: Domain, Inc., New Richmond, Wis.

[21] Appl. No.: 642,790

[22] Filed: May 3, 1996

[51] Int. Cl.$^6$ .............................. A23C 9/00; A23K 1/00
[52] U.S. Cl. ...................... 426/2; 426/624; 424/442
[58] Field of Search ........................... 424/442; 426/2, 426/64, 61, 62, 635, 623, 624

[56] References Cited

U.S. PATENT DOCUMENTS

| | | | |
|---|---|---|---|
| 4,906,641 | 3/1990 | Leitman | 514/304 |
| 5,128,167 | 7/1992 | De Laporte . | |
| 5,230,902 | 7/1993 | Gold et al. . | |
| 5,372,811 | 12/1994 | Yoder . | |
| 5,397,589 | 3/1995 | Korte et al. . | |

OTHER PUBLICATIONS

Tomkins et al., "New Developments in Milk Replacers for Pre–Ruminants", 55(54)th Minnesota Nutrition Conference and Roche Technical Symposium, Sep. 1994, pp. 71–89.

Flaherty, "'Good Bugs' Concept Gaining Acceptance", Dairy Herd Management, Mar. 1994, pp. 78–80.

"Nutrient Requirments of Dairy Cattle", Sixth Revised Edition 1988, Subcommittiee on Dairy Cattle Nutrition, Committee on Animal Nutrition, Board on Agriculture, National Research Counsel, Composition of Feeds, pp. 89, 93–95, 108–110.

Ward, Intestinal Viscosity, Broiler Performance, Poultry Digest, Apr. 1996, pp. 12–16.

Official Publication 1996, Association of American Feed Control Officials Incorporated, pp. 187, 267.

*Primary Examiner*—Deborah Yee
*Attorney, Agent, or Firm*—Fredrikson & Byron, PA

[57] ABSTRACT

Weight gain rates of calves are surprisingly increased when the calves are fed a milk replacer containing brewers yeast and dextrose, the mixture providing from 0.25 to 5 pounds of dextrose per pound of brewers yeast. Brewers yeast preferably is provided in the form of co-dried brewers yeast and brewers grains.

15 Claims, No Drawings

5,756,132

1

MILK REPLACER FOR CALVES, AND METHOD

FIELD OF THE INVENTION

The present invention relates to milk replacers employed in feeding very young calves to increase the rate of weight gain.

BACKGROUND

In the livestock industry, calves that are raised for veal and for herd replacement commonly are weaned from colostrum-rich cows milk to a nutrient-rich milk replacer within a few days following birth. Milk replacers are intended to replace whole milk and to thus provide an economic alternative to whole milk in the raising of the young animal. A variety of milk replacer compositions have been developed, including those sold commercially by Domain, Inc. under its Doboy® trademark. The latter milk replacers may include, as ingredients, dried milk, dried whey, dried whey protein concentrate, dextrose, and various vitamins and minerals. One calf milk replacer is described in De Laporte, U.S. Pat. No. 5,128,167.

Research has been ongoing for many years in an effort to determine how calves respond to various food ingredients and to formulate milk replacers to respond to the nutritive needs of pre-ruminants. A recent summary of milk replacer research is found in Trevor Tomkins, Sowinski, J. and Drackley, J. K., *New Developments in Milk Replacers for Pre-Ruminants*, 55th Minnesota Nutrition Conference & Roche Technical Symposium, 1994, pp. 71–82. This paper notes, on page 72, that the nutrient requirements of the calf are not well understood in relation to our understanding of the nutrient requirements of the young of other species.

D. C. Church, *Digestive Physiology and Nutrition of Ruminants*, Church, Dept. of Animal Science, Oregon State Univ., 1972, Vol. 3, p.122 reports that calf scours (diarrhea) has continued to be a problem with calves, and that although whole milk produces good veal calves, the protein to energy ratio may be too high for maximum weight. It has also been reported that weight gains of calves to eight weeks of age were increased by adding 3% cream or an equivalent amount of energy from glucose to 3.5% butterfat milk. J. H. B. Roy, *The Calf Nutrition and Health*, Penn. State Univ. Press, p. 100, reported that in France, a comparison of liquid diets containing 2.3–6.9% glucose and 0.5–3.5% fat showed that the highest weight gains were obtained when the highest concentration of glucose and of fat was used. Although retention of nitrogen was highest at the highest level of glucose, diarrhea was more frequent; this finding led to the recommendation that milk substitutes should contain not more than 2–3% glucose and a fat content of 2.5–3.5%. It has been reported that when more than 500 grams of lactose or glucose are given daily, there is a tendency for the calf to have diarrhea.

It has been suggested that direct-fed microbials such as yeasts may be beneficial in the feeding of calves. In Flaherty, M., in "*Good Bugs' Concept Gaining Acceptance*", Dairy Herd Management, March, 1994, pp. 78–80, it was pointed out that studies of calves fed various microorganisms provided inconclusive results. Some calves were found to gain weight; other tests showed no difference between those fed direct-fed microbials and those fed no microbials at all.

SUMMARY OF THE INVENTION

I have found that calves undergo a surprising rate of weight gain when fed a milk replacer that contains both dextrose and brewers yeast, the amount of dextrose varying from 0.25 to 5 pounds per pound of brewers yeast. The brewers yeast preferably is provided together with brewers grains, these ingredients desirably being dried together as by a Heil Triple Pass Grain Dryer or the like, so as to avoid to some extent the hygroscopic propensity of yeasts to clump and become non free-flowing. Desirably, the brewers yeast and dextrose ingredients of the invention are provided in combination with a dry, edible carrier preferably including brewers grains. The desired feeding rate for calves (after being weaned from colostrum-rich cows milk) is such as to provide from about 13 to about 95 grams of dextrose and from about 6 to about 48 grams of brewers yeast, per calf per day.

DESCRIPTION OF THE PREFERRED EMBODIMENT

"Brewers yeast" is the dried, non-fermentative, non-extracted yeast of the botanical classification Saccharomyces resulting as a by-product from the brewing of beer and ale. It commonly contains not less than about 35% crude protein. "Brewers grains" means the dried extracted residue of barley malt alone or in mixture with other cereal grain or grain products resulting from the manufacture of wort or beer, and may contain pulverized dried spent hops in an amount not exceeding 3%. A reference to definitions of brewers yeast and brewers grains may be found in the 1996 official publication of the Association of American Feed Control Officials Incorporated ("AAFCO"), pp. 187 and 267. Brewers yeast and brewers grains may be combined by drying them together in a grain dryer to provide a dry, relatively non-hygroscopic product containing approximately equal amounts by weight of brewers yeast and brewers grains. The combined, dried brewers yeast/brewers grains product is available from the F.L. Emmert Co. under its product designation BGY-35. Brewers grains in this product provide the majority of the fiber, and the BGY-35 product referred to above contains up to about 9% of fiber by weight.

Desirably, the brewers yeast and dextrose (D-glucose) are combined, preferably by thorough mixing, with dry, edible ingredients that are dispersible in water such as dried milk, dried whey, dried whey protein concentrate, dried milk protein, lactose, lard and vegetable fat, together with various minerals and vitamins. A suitable dry carrier involves substantially any of the current commercially available calf milk replacers such as Doboy® Calf Pow-R TNT "Code 322" medicated milk replacer. Sufficient dextrose and brewers yeast are employed to provide the resulting milk replacer with brewers yeast at a concentration of about 1.5% to about 10.5% and preferably about 2.5% to about 7.5%. Dextrose is employed at the rate of about 0.25 to 5 pounds of dextrose, and preferably from about 1 pound to about 3 pounds of dextrose, per pound of brewers yeast. The concentration of dextrose in the dry milk replacer of the invention ranges from about 3% to about 21%, and preferably from about 7% to about 15%.

Although the product resulting from co-drying brewers yeast and brewers grains desirably contains about equal amounts by weight of each of these ingredients, the quantity of brewers grain may be varied as desired. Brewers yeast by itself is hard to handle in modern processing equipment, and sufficient brewers grains are preferably employed to lessen the hygroscopic nature of the yeast and to render the yeast/grain product substantially free flowing.

An appropriate calf milk replacer in accordance with the invention can be manufactured by thoroughly mixing 6.7 pounds of the co-dried brewers yeast and brewers grains product containing approximately 50% of each ingredient with 80 pounds of the Doboy® Calf Pow-R TNT milk replacer referred to above and 13.3 pounds of dextrose, the mixing continuing until the brewers yeast/brewers grains product is homogeneously mixed into the other dry ingredients to provide a water-dispersible dry product. To use the dried product, the product is mixed with water at the ratio of a cup or two of dried product per quart of warm water to form a dispersion, and is fed immediately after mixing.

EXAMPLE

A calf milk replacer of the invention was manufactured by homogeneously blending into Doboy® brand Calf Pow-R TNT Code 322 milk replacer (a product of Domain, Inc.), to which had been added 13.3 pounds of dextrose per 80 pounds of the commercial product, a sufficient quantity of co-dried brewers yeast and brewers grains ("BGY-35", a product of F. L. Emmert Co.) to provide the resulting product with approximately 2.0 pounds of dextrose per pound of brewers yeast. The Doboy® Calf Pow-R TNT medicated formula contains a dry mixture of dried milk, dried whey, dried whey protein concentrate, dried milk protein, lactose, lard, vegetable fat and dextrose, the concentration of dextrose being approximately 0.1% by weight of the commercial product. The commercial product includes various minerals including magnesium sulfate, manganese sulfate, zinc sulfate, ferrous sulfate, cobalt sulfate, sodium selenite, amino acids, ethylene diamine dihydriodide, and also oxytetracycline and neomycin. Because of the inclusion of the antibiotics, administration of this milk replacer should be discontinued 30 days prior to slaughter.

The Doboy® Calf Pow-R TNT product itself, into which had been blended 13.3 pounds of dextrose per 80 pounds of the commercial product, but without added brewers yeast or brewers grains, was employed as a dextrose-containing control. The milk replacer of the invention and the control milk replacer were fed twice daily to separate groups of calves at a rate providing 56 grams of dextrose per day to each calf.

Three groups of calves were selected, the first group weighing less than 90 pounds, the second group weighing from 90-99 pounds, and the third group weighing at least 100 pounds. Each group of calves was divided into two subgroups, the milk replacer of the invention being administered to one subgroup and the control milk replacer being administered to the other subgroup. The calves in each subgroup were randomly selected, and feeding was commenced a few days after birth and continued for 35 days. The initial and final weights of each calf were measured and are presented in the following table. In each group, the subgroup fed the milk replacer of the invention gained weight at a significantly higher rate than the calves fed the control milk replacer. The total weight gain of all of the calves fed the milk replacer of the invention was over 12% greater than the weight gain of calves fed the control milk replacer.

| GROUP | NO. CALVES | AVG START WGT | AVG END WGT | AVG GAIN | % AVG GAIN |
|---|---|---|---|---|---|
| Under 90 lbs. | | | | | |
| Control | 4 | 81.00 | 116.25 | 35.25 | 43.5 |
| Invention 90-99 lbs. | 3 | 84.00 | 139.66 | 55.66 | 66.3 |
| Control | 17 | 94.76 | 137.65 | 42.89 | 45.3 |
| Invention Over 100 lbs. | 9 | 94.22 | 139.55 | 45.33 | 48.1 |
| Control | 15 | 110.33 | 153.66 | 43.33 | 39.3 |
| Invention Overall | 23 | 108.65 | 156.13 | 47.48 | 43.7 |
| Control | 36 | 99.66 | 141.94 | 42.28 | 42.4 |
| Invention | 35 | 102.83 | 150.46 | 47.63 | 46.3 |

There appears to be no ready explanation for the surprising increase in weight gain of calves fed the milk replacer of the invention. Although I do not wish to be bound by the following, it may be speculated that the brewers yeast/brewers grains supplies B vitamins and higher levels of trace minerals than, for example, skim milk, and additionally supplies selenium and chromium. Moreover, the B-vitamin content of the brewers yeast/brewers grains may tend to counter the effect of dextrose in the milk replacer of the invention so as to inhibit the onset of scours. As pointed out above, prior researchers have indicated the difficulty in attempting to balance the ingredients of milk replacers so as to provide good results.

While a preferred embodiment of the present invention has been described, it should be understood that various changes, adaptations and modifications may be made therein without departing from the spirit of the invention and the scope of the appended claims.

I claim:

1. A dry, water dispersible milk replacer for calves to promote weight gain, comprising, in combination with an edible carrier, dextrose and brewers yeast in the range of 0.25 to 5 pounds of dextrose per pound of brewers yeast.

2. The milk replacer of claim 1 including brewers grains, wherein the brewers yeast is admixed with the brewers grains to form a free-flowing product.

3. The milk replacer of claim 2 wherein said brewers yeast carried by said brewers grains is the free-flowing product resulting from drying said brewers yeast and brewers grains together.

4. The milk replacer of claim 2 including approximately equal amounts by weight of brewers yeast and brewers grains.

5. The milk replacer of claim 1 including one or more antibiotics selected from the group consisting of neomycin, and oxytetracycline.

6. The milk replacer of claim 1 including from 3 to 21 percent by weight of dextrose.

7. The milk replacer of claim 1 including from 7 to 15 percent by weight of dextrose.

8. A dry, water-dispersible milk replacer for calves to promote weight gain, comprising at least 3% by weight of dextrose, brewers yeast in the range of 0.25 to 5 pounds of dextrose per pound of brewers yeast, and an edible carrier including brewers grains.

9. The milk replacer of claim 8 comprising 7 to 15% by weight of dextrose, and containing brewers yeast in the range of 1 to 3 pounds of dextrose per pound of brewers yeast.

10. A dry, water-dispersible milk replacer for calves to promote weight gain comprising a homogeneous dry mixture including the substantially free-flowing product resulting from drying together brewers yeast and brewers grains, the milk replacer containing from 7 to 15% of dextrose, and including brewers yeast in the ratio of from 1 to 3 pounds of dextrose per 100 pounds of brewers yeast.

11. Method of increasing the rate of weight gain of calves comprising feeding the calves an aqueous dispersion of a milk replacer comprising an edible carrier and a mixture of dextrose and brewers yeast, the mixture providing from 0.25 to 5 pounds of dextrose per pound of brewers yeast.

12. Method of increasing the rate of weight gain of calves comprising feeding the calves a milk replacer comprising dextrose and brewers yeast in the range of 1 to 3 pounds of dextrose per pound of brewers yeast, and an edible carrier including brewers grains.

13. The method of claim 11 or claim 12 comprising feeding the calves sufficient milk replacer to provide from 13 to 95 grams of dextrose and about 6 to about 48 grams of brewers yeast per calf per day.

14. A milk replacer for calves to promote weight gain comprising, in an aqueous dispersion, in combination with an edible carrier, dextrose and brewer's yeast in the range of 0.25 to 5 pounds of dextrose per pound of brewer's yeast.

15. A milk replacer of claim 14 including in said dispersion brewer's grains.

\* \* \* \* \*